United States Patent

[11] 3,575,057

[72] Inventor Victor J. Kurowski
Louisville, Ky.
[21] Appl. No. 785,514
[22] Filed Dec. 20, 1968
[45] Patented Apr. 13, 1971
[73] Assignee General Electric Company

[54] DRIVE MECHANISM
7 Claims, 4 Drawing Figs.
[52] U.S. Cl. ................................................... 74/30, 68/23.7
[51] Int. Cl. ........................................... F16h 19/04, D06f 29/00
[50] Field of Search ................................... 74/50, 30; 68/23.7

[56] References Cited
UNITED STATES PATENTS
2,155,497 4/1939 Latil ............................ 74/30
2,751,773 6/1956 Woodson ..................... 68/23.7
3,085,452 4/1963 Thompson ................... 74/30

Primary Examiner—Fred C. Mattern, Jr.
Assistant Examiner—Wesley S. Ratliff, Jr.
Attorneys—James E. Espe, Harry F. Manbeck, Jr., Frank L. Neuhauser and Oscar B. Waddell ABSTRACT: A drive mechanism for an automatic clothes washer is provided having a single reversibly rotatable input shaft and first and second concentric output shafts. The first output shaft connects with an agitator for low speed oscillation thereof when the input shaft rotates in one direction. The second output shaft connects to a washing basket for high speed centrifugal extraction rotation thereof when the input shaft rotates in the opposite direction. A first direction responsive means for operating the first output shaft comprises a crank member operably connected to the input shaft for rotation thereby, a rack operably connected to the crank member for reciprocation thereby, a pinion operably connected to the first output shaft, and means for engaging and disengaging the rack from the pinion. A second direction responsive means for operating the second output shaft comprises a first gear connected through a direction responsive spring clutch to the input shaft, and a second gear driven from the first gear and operably connected to the second output shaft.

INVENTOR.
VICTOR J. KUROWSKI

BY James E. Espe

HIS ATTORNEY

DRIVE MECHANISM

BACKGROUND OF THE INVENTION

This invention relates to automatic washers of the type which wash clothes and then partially dry them by centrifugal extraction. In particular, my invention relates to a drive mechanism for use in such machines to provide, selectively, washing action and centrifugal extraction.

It is desirable in an automatic washer to provide a drive mechanism of the type including a single input shaft which is arranged to produce, dependent upon the direction of rotation of the input shaft, a drive for the shaft of the washing means, or a drive to the centrifugal extractor shaft. Automatic control is facilitated by such mechanisms since selection of washing action or of centrifugal extraction is accomplished merely by controlling the direction of rotation of the driving motor. The drive mechanisms currently employed in automatic washers are exceedingly complex and expensive, the complexity arising from the difficulty of providing a reliable mechanism to move the agitator in oscillatory rotation to stir the clothes about in the basket during the washing cycle, and to move the basket in unidirectional rotation at high speed during the extraction cycle.

Therefore, an important object of my invention is to provide a low cost mechanism of simple design for driving a washing machine which employs an agitation cycle and a centrifugal extraction cycle.

SUMMARY OF THE INVENTION

Briefly stated, in accordance with one aspect of the present invention, there is provided a drive mechanism having a reversibly rotatable input shaft, a first output shaft and a second output shaft. A first direction responsive means is operably connected to the input shaft and the first output shaft to rotate the first output shaft in oscillatory motion when the input shaft rotates in one rotational direction. A second direction responsive means is operably connected to the input shaft and the second output shaft to rotate the second output shaft at high speed when the input shaft rotates in the opposite rotational direction. The first direction responsive means comprises a crank member operably connected to the input shaft for rotation thereby, a rack having a toothed surface, the rack being operably connected to the crank member for reciprocation thereby, and a pinion operably connected to the first output shaft. The first direction responsive means additionally includes engagement means for engaging the rack with the pinion for oscillation thereby, disengagement means for disengaging the rack from the pinion, and direction responsive actuating means. The actuating means is adapted to actuate the engagement means when the input shaft rotates in the one rotational direction, and to actuate the disengagement means when the input shaft rotates in the opposite rotational direction.

BRIEF DESCRIPTION OF THE DRAWINGS

While the specification concludes with claims particularly pointing out and distinctly claiming the subject matter which is regarded as the invention, it is believed the invention will be better understood from the following description of the preferred embodiment taken in connection with the accompanying drawings, in which:

DESCRIPTION OF THE PREFERRED EMBODIMENT

Figure 1:
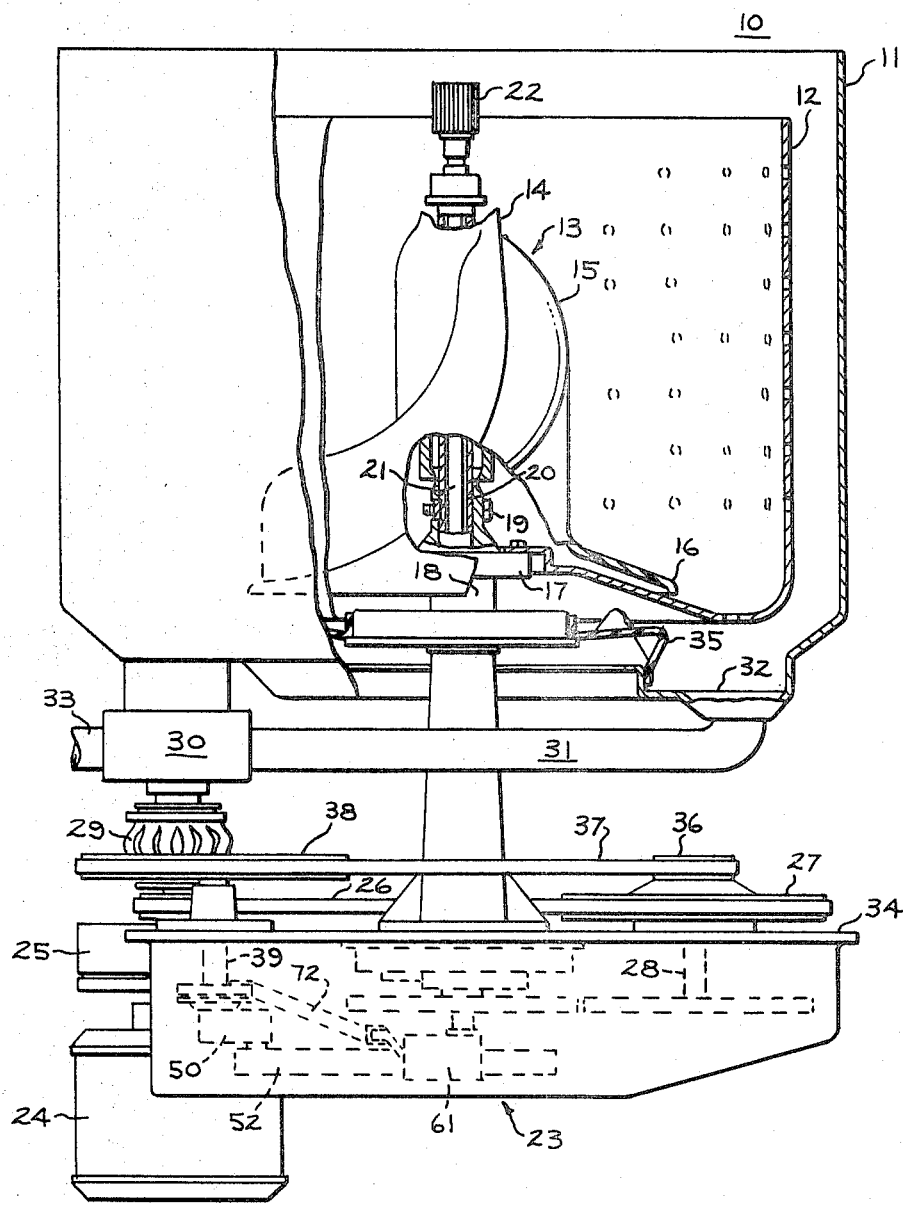
FIG. 1 is a partial sectional view of a washing machine incorporating one embodiment of my invention.

Referring now to the drawings, and initially to FIG. 1 thereof, there is illustrated an agitator-type vertical axis automatic clothes washer 10. The washer 10 is normally mounted within a suitable appearance and protective cabinet which, in the interest of clarity, has been omitted from the drawings. The washer may include a rigidly mounted imperforate tub 11 having a perforate washing basket or container 12 rotatably supported therein for washing and rinsing clothes therein and for centrifugally extracting liquid therefrom. At the center of basket 12 there is provided an agitator 13 which includes a center post 14 having a plurality of curved water circulating vanes 15 joined at their lower end to form an outwardly flared skirt 16. Normally a resilient gasket (not shown) is provided between the upper edge of tub 11 and the appearance cabinet to prevent moisture from escaping into the space between the tub and cabinet.

Both the washing basket 12 and the agitator 13 are rotatably mounted. The basket is mounted on a flange 17 of a hub 18 clamped by a pair of bolts 19 (one of which is not shown) to a spin tube or second output shaft 20. The agitator 13 is mounted on an agitator drive shaft or first output shaft 21 which extends upwardly through hub 18 and through center post 14 and is secured to the agitator through a splined portion 22 so as to drive it. During one possible cycle of operation of washer 10, liquid is introduced into a tub 11 and basket 12, and the agitator is oscillated back and forth around its axis to wash clothes within the basket. After a predetermined period of this washing action, basket 12 is rotated at high speed to centrifugally extract the washing liquid from the fabrics. Following this extraction operation, a supply of clean liquid is introduced into the basket for rinsing the fabrics and the agitator is again oscillated. Finally, the basket is once more rotated at high speed to extract the rinse liquid.

The basket 12 and agitator 13 are selectively rotated by a drive mechanism 23 which is the subject of my invention. The drive mechanism 23, in turn, is driven by a reversible motor 24 through a clutch 25 mounted on the motor shaft. The motor is tailored so as to be used to its full extent when it accelerates the basket 12 to spin speed. In order to assist the motor during starting, clutch 25 allows the motor to start without load and then accept the load as it comes up to speed. A suitable belt 26 transmits power from clutch 25 through sheave 27 to a reversibly driven input shaft 28 of drive mechanism 23.

As will be explained below in detail, drive mechanism 23 is so arranged that it drives both the agitator drive shaft 21 and the basket mounting hub 18. When motor 24 is rotated in one direction, the transmission causes agitator 13 to move in oscillatory rotation and, when motor 24 is driven in the opposite direction, the transmission rotates the washing basket 12 at high speed for centrifugal fluid extraction. Although no direct connection is provided between the basket 12 and the agitator 13, drive friction therebetween will cause agitator 13 to rotate at high speed with basket 12 during spin.

In addition to operating the drive mechanism 23 as described, motor 24 also provides a direct drive through a flexible coupling 29 to a pump 30. Pump 30 has an inlet connected by conduit 31 to an opening 32 formed in the lowermost part of tub 11 and an outlet connected by a conduit 33 to a suitable drain (not shown). When the motor 24 is operating so as to provide agitation, pump unit 30 is rotated in a reverse direction wherein it is substantially inoperative. When the motor 24 is reversed so as to rotate basket 12 and agitator 23 together to centrifugally extract fluid from fabrics in the basket, pump unit 30 will draw liquid from opening 32 through conduit 31 and discharge it through conduit 33 to the drain.

Basket 12, agitator 13, motor 24, clutch 25 and drive mechanism 23 form a suspended washing and centrifuging system mounted on a bracket 34 which may be supported by a suspension system (not shown) from the stationary structure of the machine so as to permit isolation of vibrations from the stationary structure. In order to accommodate the movement which occurs between basket 12 and tub 11 without any danger of fluid leakage between them, the stationary tub 11 is joined to the upper part of drive mechanism 23 by a flexible boot member 35.

It will be understood that, while the description of the machine thus far excludes a substantial amount of detail relating to the supporting structure and does not show all the valves and particular controls normally provided on modern domestic washing machines, the elimination and simplification of these items is primarily for the purpose of permitting a clear explanation of the inventive concept set forth below. It will be recognized that the omitted details are conventional items included in virtually all domestic washing machines, whose structure and positioning is well known to those skilled in the art.

Figure 2:
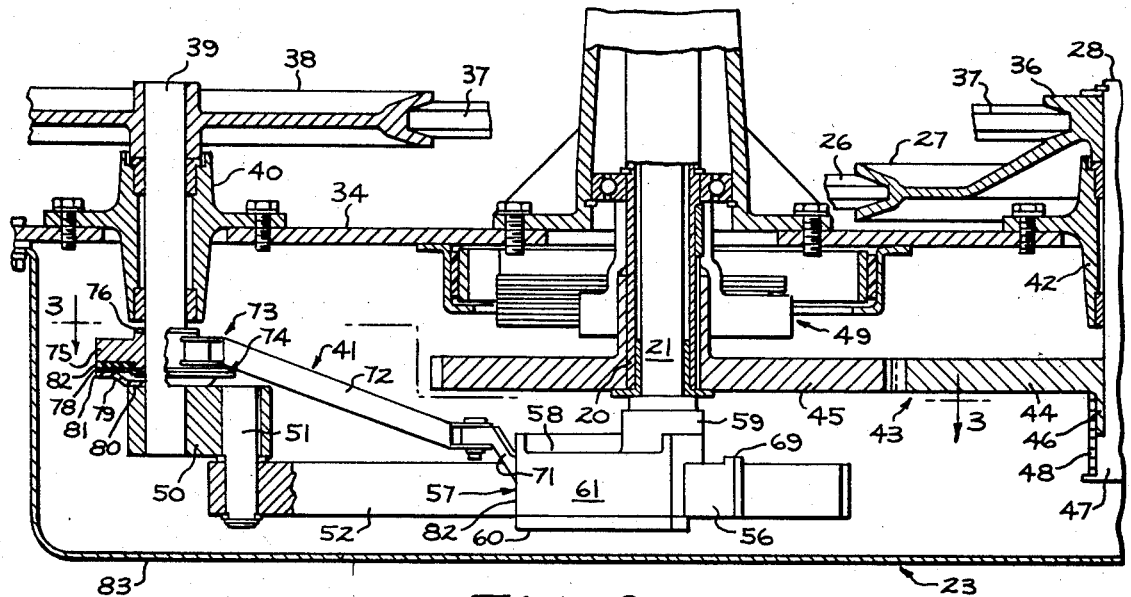
FIG. 2 is an enlarged sectional view of a portion of the machine of FIG. 1 showing the drive mechanism of my invention.

Referring now more particularly to FIG. 2 wherein one embodiment of my device is illustrated, it will be seen that input shaft 28 has a first pulley 36 mounted thereon to transmit power through a suitable belt 37 to a second pulley 38 mounted on the upper end of a crankshaft 39. As second pulley 38 is larger in diameter than first pulley 36, crankshaft 39 will be driven slower than input shaft 28. Crankshaft 39 is rotatably supported by a bearing structure 40 from bracket 34. Operably connected to the lower end of crankshaft 39 and to the lower end of the agitator drive or first output shaft 21 is a first direction responsive means 41 adapted to rotate shaft 21 in oscillatory motion when input shaft 28 rotates in one rotational direction, and to discontinue oscillatory drive motion to first output shaft 21 when input shaft 28 rotates in the opposite rotational direction. The first direction responsive means 41 will be explained in detail in conjunction later.

Rotatably supporting input shaft 28 at a position beneath sheave 27 is a bearing structure 42 secured to bracket 34. Operably connecting with the lower end of input shaft 28 and the lower end of spin tube or second output shaft 20 is a second direction responsive means 43 adapted to rotate output shaft 20 at high speed when the input shaft 28 is rotated in the aforementioned opposite rotational direction. In the preferred embodiment of my device, second direction responsive means comprises a first gear 44 rotatably mounted on the lower portion of input shaft 28 and positioned to drive a second gear 45 operably associated with the lower end of spin tube 20 to drive the spin tube. First gear 44 has a hub portion 46 which is supported by an end portion 47 of enlarged diameter on input shaft 28. A direction responsive spring clutch 48 comprising a coil spring pressed onto hub 46 and portion 47. When input shaft 28 rotates in the aforementioned one rotational direction, the lower coils of spring clutch 48 will be so rotated as to unwind slightly and permit portion 47 to rotate within these lower coils. However, when input shaft 28 is rotated in the opposite direction, the lower coils of spring clutch 48 will tend to tighten about portion 47 and hub 46 will be directly driven from portion 47 through spring clutch 48 thereby causing rotation of spin tube 20. As first gear 44 is substantially the same size as second gear 45, spin tube 20 will be driven at substantially the same high speed as input shaft 28.

In order to prevent a creeping movement of spin tube 20 and connected washing basket 12 during agitation, and to stop basket 12 from spinning when input shaft 28 is no longer rotating in the aforementioned opposite direction so as to deliver power to output shaft 20, a brake mechanism 49 is provided in association with output shaft 20.

Figure 3:
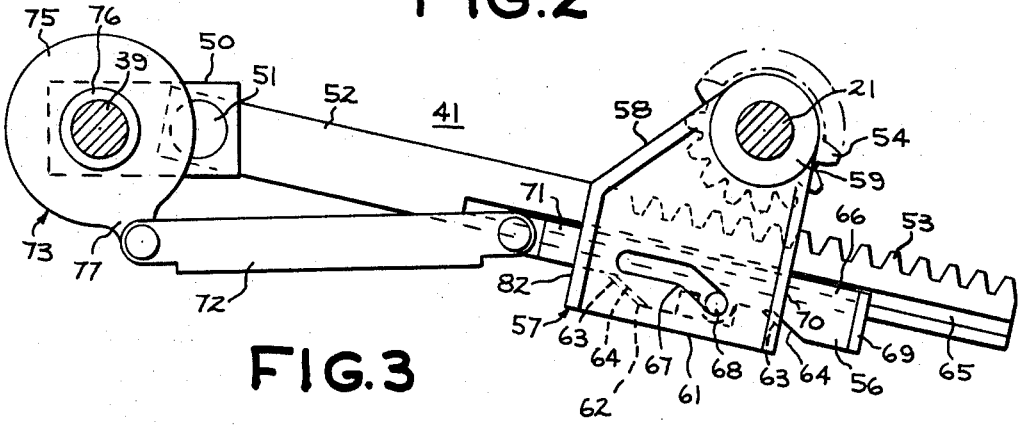
FIG. 3 is a sectional view of my drive mechanism taken along line 3-3 of FIG. 2 with the rack and pinion disengaged.
Figure 4:
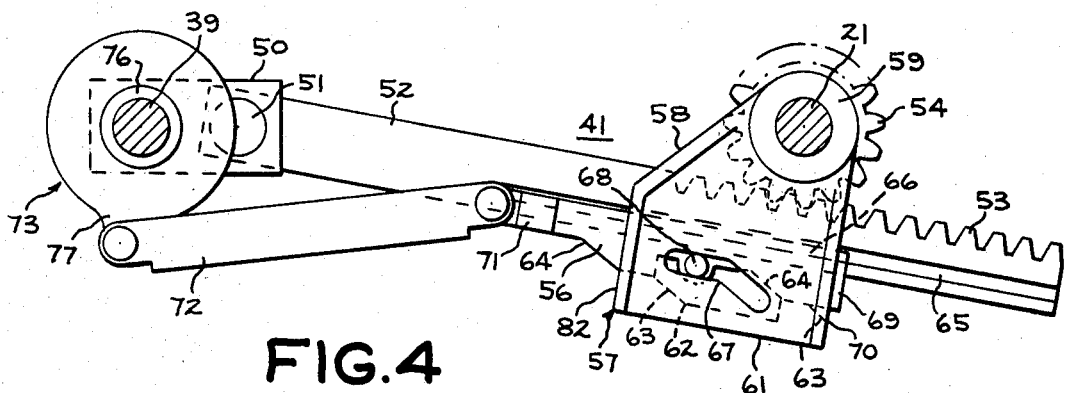
FIG. 4 is a sectional view similar to FIG. 3 with the rack and pinion engaged.

Referring now more particularly to FIGS. 3 and 4 in conjunction with FIG. 2, first direction responsive means 41 will be seen to comprise a crank member 50 rigidly connected to crankshaft 39 for rotation thereby. Rigidly secured to crank member 50 is pivot pin 51 which extends downwardly from crank member 50 to pivotally connect with a rack 52 having a toothed surface 53 thereon. A pinion 54 is rigidly connected to agitator drive or first output shaft 21 and positioned to cooperate with rack 52. An engagement means, as will be described below, is provided to engage rack 52 with pinion 54 for oscillation thereby, and a disengagement means is provided for disengaging rack 52 from pinion 54.

The engaging means comprises a wedge means or reciprocally movable member 56. Supporting rack 52 and wedge means 56 is a positioning means or pivotally mounted member 57 having an extended top plate 58 with a hub 59 formed thereon for rotatably engaging first output shaft 21. Positioning means 57 additionally comprises a bottom plate 60 of limited extent for supporting at least a portion of rack 52 and wedge means 56. Interconnecting top plate 58 and bottom plate 60 is an upstanding wall 61 having a cam surface 62 formed integral therewith on the interior thereof. Cam surface 62 is seen to include two ramps 63 formed thereon. Cooperating ramps 64 are formed on wedge means 56 for urging the rack 52 into engagement with pinion 54 when the wedge means is urged to the left in one displacement direction.

The disengagement means is designed to be operable with the wedge means 56 to disengage rack 52 from pinion 54 when the wedge means is urged in the opposite displacement direction, and comprises a first interlocking means operable between the wedge means 56 and rack 52 to assure sliding engagement therebetween, and a second interlocking means operable between wedge means 56 and cam surface 62 to assure sliding contact therebetween. The first interlocking means comprises a longitudinal, upwardly facing groove 65 in rack 52 formed parallel to toothed surface 53, and a tab portion 66 extending downwardly from wedge means 56 into groove 65 for sliding cooperation therewith to maintain wedge means 56 and rack 52 in sliding contact at all times. The second interlocking means comprises a vertically oriented slot 67 formed in positioning means 57 substantially parallel to ramps 63 and 64, and a pin portion 68 extending upwardly into slot 67 for sliding cooperation therewith to assure that wedge means 56 moves parallel to cam surface 62. By this arrangement, when wedge means 56 is urged in the aforementioned opposite displacement direction, pin portion 68 sliding in slot 67 will cause wedge means 56 to move along cam surface 62 with ramps 63 engaging ramps 64 causing wedge means 56 to move away from pinion 54. Similarly, tab portion 66 sliding in slot 65 will cause rack 52 to maintain sliding contact with wedge means 56 thereby resulting in rack 52 moving away from pinion 54 as wedge means 65 is caused to move away from pinion 54.

Formed integral with one end of wedge means 56 is an upstanding bumper portion 69 which is adapted to contact right side 70 of positioning means 57 to limit the movement of wedge means 56 in the aforementioned one displacement direction. Formed integral with the opposite end of wedge means 56 is an upstanding connection arm 71 adapted to pivotally connect with one end of a linkage element 72.

Pivotally connecting with the other end of linkage element 72 and operably connected to crankshaft 39 is a direction responsive actuating means 73 adapted to actuate the engagement means when input shaft 28 rotates in the aforementioned one rotational direction, and to actuate the disengagement means when input shaft 28 rotates in the opposite rotational direction. Actuating means comprises a direction responsive slip clutch 74 adapted to exert a pulling force on linkage element 72 and wedge means 56 to move the wedge means in the aforementioned one displacement direction when input shaft 28 rotates in the aforementioned one rotational direction, thereby engaging rack 52 with pinion 54. Slip clutch 74 is additionally adapted to exert a pushing force on linkage element 72 and wedge means 56 to move the wedge means in the opposite displacement direction when input shaft 28 rotates in the opposite rotational direction thereby disengaging rack 52 from pinion 54.

Slip clutch 74 comprises a connection ring 75 rotatably mounted upon crankshaft 39 and prevented from moving upwardly on crankshaft 39 by a snap ring 76 engaging a groove in the crankshaft. Pivotally connected to an extended portion 77 of connection ring 75 is linkage element 72. Positioned somewhat beneath connection ring 75 on crankshaft 39 is a washer 78 which is urged upwardly by a spring member 79. Spring member 79 is of annular configuration having a central portion 80 contacting crank member 50 and a raised outer portion 81 serving to bias washer 78 upwardly. Positioned between washer 78 and connection ring 75 is a clutch disc 82 of asbestos-filled material or other suitable material as is commonly used in brake bands and brake linings. Disc 82 rotates freely about crankshaft 39 and serves to transmit motion between connection ring 75 and washer 78 which is secured to shaft 39 and rotates continuously therewith.

By this arrangement when input shaft 28 rotates in the aforementioned one direction, such rotational motion will be transmitted by belt 37 to crankshaft 39. Crankshaft 39 in turn will rotate crank member 50 causing rack 52 to reciprocate within positioning means 57. Meanwhile washer 78 acting through clutch disc 82 will cause connecting ring 75 to rotate, exerting a pulling force through linkage element 72 on wedge means 56 causing the wedge means to move in the aforementioned one displacement direction engaging rack 52 with pinion 54, as shown in FIG. 4, whereby the agitator drive or first output shaft will oscillate. Wedge means 56 will continue to move in the one displacement direction under the pull of connection ring 75 until bumper portion 69 contacts right side 70 of positioning means 57. At this time, connection ring 75 will discontinue rotating in conjunction with washer 78 and clutch 74 will slip. At the same time, while input shaft 28 is rotating in the aforementioned one rotational direction spring clutch 48 will transmit no motion to gear hub 46 and brake mechanism 49 will keep spin tube or second output shaft 20 from rotating.

However, when input shaft 28 is rotated in the opposite rotational direction, spring clutch 48 will transmit motion to gear hub 46 thereby causing brake mechanism 49 to release and second output shaft 20 to rotate. Simultaneously, the opposite rotational motion is transmitted to crankshaft 39 by belt 37 from input shaft 28. Such opposite rotational motion will again cause crank member 50 to rotate causing rack 52 to reciprocate. However, such opposite rotational motion will cause washer 78 acting through clutch disc 82 and connection ring 75 to exert a pushing force on linkage element 72 and wedge means 56 whereby wedge means 56 will move in the opposite displacement direction causing rack 52 to disengage from pinion 54, as shown in FIG. 3. Wedge means 56 will continue its opposite displacement direction movement until connection arm 71 contacts left side 82 of positioning means 57. At this time connection ring will again discontinue rotating in conjunction with washer 78 and clutch 74 will slip. As agitator drive or first output shaft 21 is thereby disconnected from input shaft 28, it is free to remain stationary or to rotate with output shaft 20 as friction in other areas of the washer 10 may dictate.

In order to provide for proper mechanism and long life of the components of my drive mechanism as described, I provide an outer protective pan 83 secured to bracket 34. Pan 83 is so constructed as to hold oil of proper viscosity to assure smooth operation and proper lubrication of the aforedescribed drive mechanism components.

As was previously mentioned the drive mechanism of my invention is particularly adapted for use in automatic clothes washers wherein it is desirable to employ a drive mechanism of simple, low cost design to provide agitation or spin motion depending on the direction of rotation of the input shaft thereto. From the foregoing description it should now be apparent that the present invention provides such a drive mechanism of simple design employing a plurality of direction responsive means to operably connect the drive shaft with either agitation or spin motion drive means.

As will be evident from the foregoing description, certain aspects of the invention are not limited to the particular details of the construction of the example illustrated, and it is contemplated that various other modifications or applications will occur to those skilled in the art. It is therefore intended that the appended claims shall cover such modifications and applications as do not depart from the true spirit and scope of the invention. What I claim as new and desire to secure by Letters Patent of the United States:

I claim:

1. A drive mechanism comprising:
   a reversibly rotatable input shaft, a first output shaft and a second output shaft;
   a first direction responsive means operably connected to said input shaft and said first output shaft to rotate said first output shaft in oscillatory motion when said input shaft rotates in one rotational direction;
   a second direction responsive means operably connected to said input shaft and said second output shaft to rotate said second output shaft at high speed when said input shaft rotates in the opposite rotational direction;
   said first direction responsive means comprising a crank member operably connected to said input shaft for rotation thereby, a rack having a toothed surface, said rack operably connected to said crank member for reciprocation thereby, a pinion operably connected to said first output shaft, engagement means for engaging said rack with said pinion for oscillation thereby, disengagement means for disengaging said rack from said pinion, and direction responsive actuating means for actuating said engagement means when said input shaft rotates in said one rotational direction, and for actuating said disengagement means when said input shaft rotates in said opposite rotational direction.

2. The drive mechanism of claim 1 wherein:
   said actuating means comprises a direction responsive slip clutch adapted to exert a force in one displacement direction when said input shaft is rotated in said one rotational direction, and adapted to exert a force in the opposite displacement direction when said input shaft is rotated in said other rotational direction;
   said engagement means comprises a wedge means operably connected to said slip clutch and adapted to force said rack into engagement with said pinion when urged in said first displacement direction by said slip clutch; and
   said disengagement means being operable with said wedge means to disengage said rack from said pinion when said wedge means is urged in said opposite displacement direction by said slip clutch.

3. The drive mechanism of claim 2 wherein:
   said positioning means is pivotally mounted about an axis coaxial with said pinion, and being operable to support at least a portion of said wedge means and said rack;
   said engagement means additionally comprises a cam surface extending from said positioning means and operable with said wedge means to force said rack into engagement with said pinion when said wedge means is urged in said one displacement direction by said slip clutch; and
   said disengagement means additionally comprises a first interlocking means between said wedge means and said rack to assure sliding contact therebetween, and a second interlocking means between said wedge means and said cam surface to assure sliding contact therebetween, whereby said wedge means is caused to move away from said pinion and said rack is caused to disengage from said pinion when said wedge means is urged in said other displacement direction by said sip clutch.

4. The drive mechanism of claim 3 wherein:
   said wedge means and said cam surface each have two cooperating ramps for urging said rack into engagement with said pinion;
   said cam surface is formed integral with said positioning means;

said first interlocking means comprises a longitudinal groove in said rack formed parallel to said toothed surface, and a tab portion extending from said wedge means and adapted to cooperate with said groove; and said second interlocking means comprises a slot formed in said positioning means substantially parallel to both of said ramps, and a pin portion extending from said wedge means.

5. The drive mechanism of claim 4 wherein said second direction responsive means comprises a direction responsive spring clutch.

6. The drive mechanism of claim 5 wherein:

said first direction responsive means additionally comprises a crank shaft driven from said input shaft, said crank shaft having mounted thereon said crank member and said slip clutch;

said spring clutch is mounted on said input shaft; and said second output shaft is coaxial about said first output shaft.

7. The drive mechanism of claim 6 additionally comprising:

a first pulley mounted on said input shaft;

a relatively larger second pulley mounted on said crank shaft;

a belt operably extending between said pulleys to drive said crank shaft from said input shaft at a slower speed than said input shaft;

a first gear mounted concentrically about said input shaft and operably connected to said spring clutch; and a second gear of substantially similar dimension as said first gear, mounted on said second output shaft to rotate said second output shaft at substantially the same speed as said input shaft.